(12) United States Patent
Salivar et al.

(10) Patent No.: US 8,692,881 B2
(45) Date of Patent: Apr. 8, 2014

(54) SYSTEM AND METHOD FOR CORRELATING CAMERA VIEWS

(75) Inventors: William Matthew Salivar, Knoxville, TN (US); John Michael Rozmus, Knoxville, TN (US); Robert Gerald Palmer, Jr., Knoxville, TN (US)

(73) Assignee: Sony Corporation, Tokyo (JP)

( * ) Notice: Subject to any disclaimer, the term of this patent is extended or adjusted under 35 U.S.C. 154(b) by 1154 days.

(21) Appl. No.: 12/491,836

(22) Filed: Jun. 25, 2009

(65) Prior Publication Data
US 2009/0262196 A1  Oct. 22, 2009

Related U.S. Application Data

(63) Continuation of application No. 10/949,701, filed on Sep. 24, 2004, now Pat. No. 7,629,995.

(60) Provisional application No. 60/599,346, filed on Aug. 6, 2004.

(51) Int. Cl.
*H04N 7/18* (2006.01)
*G09G 5/00* (2006.01)

(52) U.S. Cl.
USPC .......................................... 348/143; 345/647

(58) Field of Classification Search
CPC ............................. G06F 3/0481; H04N 7/181
USPC .............. 348/143, 36, 335, 584, 647, 207.99, 348/159; 382/286; 345/647; 396/85; 356/139.03; 351/246
See application file for complete search history.

(56) References Cited

U.S. PATENT DOCUMENTS

| | | |
|---|---|---|
| 4,549,208 A | 10/1985 | Kamejima et al. |
| 4,908,874 A | 3/1990 | Gabriel |
| 4,992,866 A | 2/1991 | Morgan |
| 5,067,019 A | 11/1991 | Juday et al. |
| 5,130,794 A | 7/1992 | Ritchey |
| 5,185,665 A * | 2/1993 | Okura et al. .................. 348/584 |
| 5,185,667 A | 2/1993 | Zimmermann |
| 5,313,306 A | 5/1994 | Kuban et al. |
| 5,359,363 A | 10/1994 | Kuban et al. |
| 5,365,597 A | 11/1994 | Holeya |
| 5,384,588 A | 1/1995 | Martin et al. |

(Continued)

FOREIGN PATENT DOCUMENTS

| | | |
|---|---|---|
| EP | 0 610 863 B1 | 11/2001 |
| EP | 0 971 540 B1 | 6/2002 |
| JP | Hei-2-127877 | 5/1990 |

OTHER PUBLICATIONS

Cao, et al.; "Dynamic Omnidirectional Vision for Mobile Robots"; SPIE vol. 579; Intelligent Robots and Computer Vision; pp. 405-414; (1985). 10 pages.

(Continued)

*Primary Examiner* — Gims Philippe
(74) *Attorney, Agent, or Firm* — Finnegan, Henderson, Farabow, Garrett & Dunner, LLP

(57) ABSTRACT

A method for correlating views of two or more video camera systems includes obtaining a plurality of data point coordinate sets to represent relative positioning between the camera systems and data point objects in the environment. The views may be correlated through Interpolation or extrapolation using the obtained data point coordinate sets. Devices such as lasers may also be used to correlate views of two or more video camera systems.

14 Claims, 8 Drawing Sheets

(56) References Cited

U.S. PATENT DOCUMENTS

| | | | |
|---|---|---|---|
| 5,434,617 | A | 7/1995 | Bianchi |
| 5,546,807 | A | 8/1996 | Oxaal et al. |
| 5,654,750 | A | 8/1997 | Weil et al. |
| 5,657,073 | A | 8/1997 | Henley |
| 5,684,937 | A | 11/1997 | Oxaal |
| 5,764,276 | A | 6/1998 | Martin et al. |
| 5,877,801 | A | 3/1999 | Martin et al. |
| RE36,207 | E | 5/1999 | Zimmermann et al. |
| 5,903,319 | A | 5/1999 | Busko et al. |
| 5,903,782 | A | 5/1999 | Oxaal |
| 5,936,630 | A | 8/1999 | Oxaal |
| 5,990,941 | A | 11/1999 | Jackson et al. |
| 6,002,430 | A * | 12/1999 | McCall et al. ............ 348/207.99 |
| 6,118,454 | A | 9/2000 | Oxaal |
| 6,126,600 | A | 10/2000 | Oxaal |
| 6,147,709 | A | 11/2000 | Martin et al. |
| 6,157,385 | A | 12/2000 | Oxaal |
| 6,201,574 | B1 | 3/2001 | Martin |
| 6,215,519 | B1 * | 4/2001 | Nayar et al. ................. 348/159 |
| 6,241,675 | B1 | 6/2001 | Smith et al. |
| 6,243,099 | B1 | 6/2001 | Oxaal |
| 6,243,131 | B1 | 6/2001 | Martin |
| 6,252,603 | B1 | 6/2001 | Oxaal |
| 6,256,061 | B1 | 7/2001 | Martin et al. |
| 6,271,853 | B1 | 8/2001 | Oxaal |
| 6,301,447 | B1 | 10/2001 | Jackson et al. |
| 6,323,862 | B1 | 11/2001 | Oxaal |
| 6,438,272 | B1 * | 8/2002 | Huang et al. ................. 382/286 |
| 6,492,985 | B1 | 12/2002 | Mutz et al. |
| 6,603,502 | B2 | 8/2003 | Martin et al. |
| 6,611,282 | B1 | 8/2003 | Trubko et al. |
| 6,687,387 | B1 | 2/2004 | Molnar et al. |
| 6,731,284 | B1 | 5/2004 | Oxaal |
| 6,778,207 | B1 * | 8/2004 | Lee et al. ........................ 348/36 |
| 6,778,211 | B1 | 8/2004 | Zimmermann et al. |
| 6,795,113 | B1 | 9/2004 | Jackson et al. |
| 6,833,843 | B2 | 12/2004 | Mojaver et al. |
| 6,839,067 | B2 * | 1/2005 | Liu et al. ....................... 345/647 |
| 6,997,556 | B2 * | 2/2006 | Pfleger .......................... 351/246 |
| 7,064,817 | B1 * | 6/2006 | Schmitt et al. ............ 356/139.03 |
| 2002/0102101 | A1 * | 8/2002 | Pelletier ........................... 396/85 |
| 2005/0062869 | A1 * | 3/2005 | Zimmermann et al. ....... 348/335 |

OTHER PUBLICATIONS

Ehtashami, et al.; "Omnidirectional Position Location for Mobile Robots"; University of Cincinnati; (date unknown). 11 pages.

Anderson, et al.; "Omnidirectional Real Time Imaging Using Digital Restoration"; SPIE vol. 348; High Speed Photography; (1982). 10 pages.

Alvertos, et al.; "Omnidirectional Viewing: The Fish-Eye Lens Problem"; University of Tennessee; (date unknown). 6 pages.

Author Unknown; "Eclipse 360° Intelligent Video Camera: Installation and User Manual"; version 2.11; Vista; (2004). 65 pages.

Author Unknown; "No Moving Parts, 360 Degree Surveillance"; Vista; (date unknown). 2 pages.

Author Unknown; "Halocam . . . a New Kind of Camera"; Grandeye; (date unknown). 6 pages.

Author Unknown; "Grandeye: 360° View for Total Situational Awareness"; Grandeye; (date unknown). 28 pages.

Author Unknown; "Photons to Bits: The Sensor's Role in a Digital Camera System"; Micron; (2005). 14 pages.

Screenshot from http://infomedia.ipix.com, relating to movies, printed Feb. 2005. 1 page.

Prosecution history for U.S. Reissue Patent No. Re 36,207. 1,438 pages.

* cited by examiner

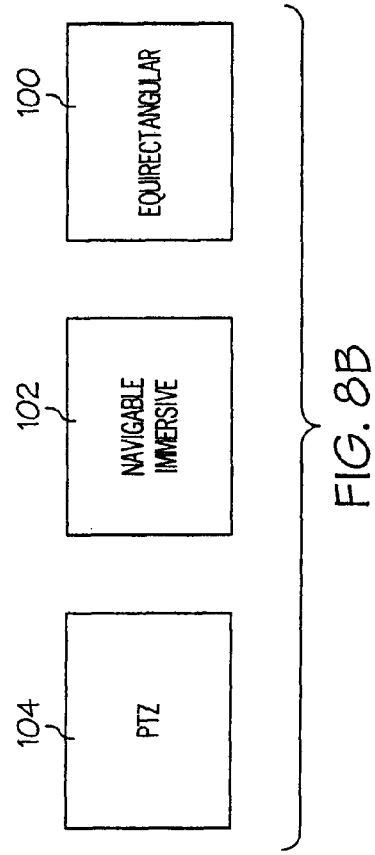
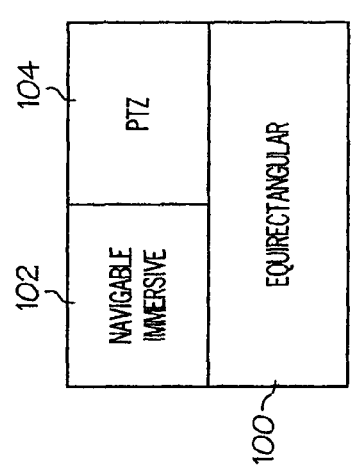
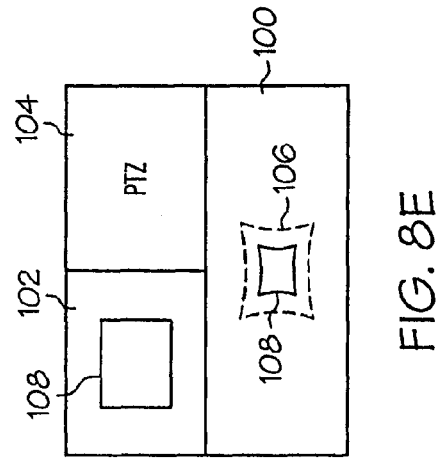
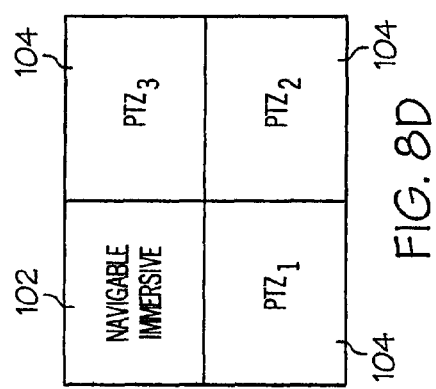
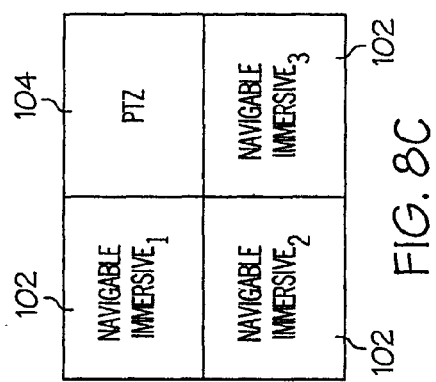

SYSTEM AND METHOD FOR CORRELATING CAMERA VIEWS

PRIORITY

This application is a continuation of application Ser. No. 10/949,701, filed Sep. 24, 2004, now U.S. Pat. No. 7,629,995 which claims priority from the disclosure of U.S. Provisional Patent Application Ser. No. 60/599,346, entitled "System and Method for Immersive Surveillance," filed Aug. 6, 2004. The contents of all of the above-listed applications are expressly incorporated herein by reference in their entirety.

BACKGROUND

The present invention relates in general to video systems, with one embodiment having an image capture and display system and method providing both a wide angle field of view and a narrower field of view of an environment.

It is often desirable to have the ability to view a large area within an environment. It may also be desirable to have the ability to focus in on objects or events of interest within the environment. Such capabilities may be useful for a variety of purposes, including but not limited to surveillance for security or military applications. No one prior to the inventors has created or used the invention described in the appended claims.

BRIEF DESCRIPTION OF DRAWINGS

While the specification concludes with claims that particularly point out and distinctly claim the invention, it is believed the present invention will be better understood from the following description taken in conjunction with the accompanying drawings, in which like reference numerals identify the same elements. The drawing and detailed description which follow are intended to be merely illustrative and are not intended to limit the scope of the invention as set forth in the appended claims.

FIGS. 8A through E depict various user interface displays.

DETAILED DESCRIPTION

The following description should not be used to limit the scope of the present invention. Other examples, features, aspects, embodiments, and advantages of the invention will become apparent to those skilled in the art from the following description, which includes by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
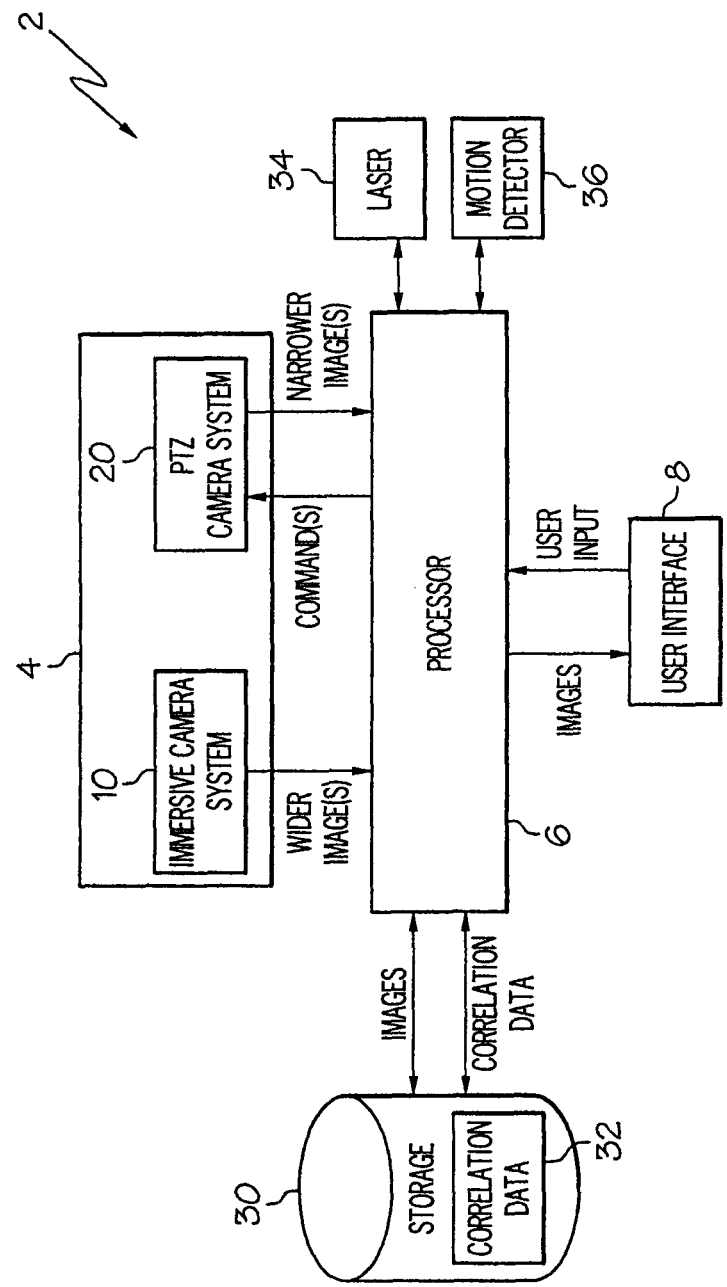
FIG. 1 depicts a diagram of an image capture and display system.

FIG. 1 illustrates an image capture and display system (2) comprising an image capture system (4), a processor (6), and a user interface (8). While a single processor (6) is shown and discussed by way of example, it will be appreciated that any number of processors may be used in any suitable configuration or arrangement. The image capture system (4) comprises a first and second camera system (10, 20). In the present example, the immersive and PTZ camera systems (10, 20) are in communication with the processor (6), as is the user interface (8). The immersive and PTZ camera systems (10, 20) capture images, which are processed and/or relayed by the processor (6) to a user via the user interface (8). In one embodiment, the immersive camera system (10) communicates a first digital video signal to the processor (6), while the PTZ camera system (20) communicates a second digital video signal to the processor (6). The first digital video signal corresponds to a video image captured by the immersive camera system (10), while the second digital video signal corresponds to a video image captured by the PTZ camera system (20).

The user interface (8) includes a display, which displays at least one of the images provided by the image capture system (4) to a user. The user interface (8) of the present example is further configured to receive user input, such as instructions or commands from the user, some of which may be transmitted through the processor (6) to one or more of the cameras. By way of example, the user input may include commands or instructions affecting the field of view provided by the PTZ camera system (20), such as commands changing the orientation and/or zoom level of a camera within the PTZ camera system (20). Accordingly, the user interface (8) comprises a control for orienting the PTZ camera system (20). Other possible user inputs will be apparent to those of ordinary skill in the art.

As shown, the image capture and display system (2) optionally comprises a storage device (30) in communication with the processor (6). Examples of suitable storage devices (30) include hard disk drives, optical drives, volatile and non-volatile memory, and the like. The storage device (30) may store one or more of the images captured by the immersive or PTZ camera systems (10, 20). The storage device (30) may also store correlation data (32) for correlating the fields of view provided by the immersive and PTZ camera systems (10, 20), which may be accessed by the processor (6) for such correlation. The storage device (30) may additionally or alternatively store a variety of other information, including maps or models of the environment, executable code for directing the processor (6), information relating to use of the system, or any other data. As also shown, the system optionally comprises a laser (34) and a motion detector (36), each being in communication with the processor (6).

The camera systems (10, 20), processor (6), user interface (8), and other parts of the image capture and display system (2) may be in communication via any suitable means, mode, method, or medium. By way of example only, the images, inputs such as commands, and/or other data may be communicated in whole or in part via the Internet, a Local Area Network (LAN), a Wide Area Network (WAN), or any other type of open or closed network, including combinations thereof. It will also be appreciated that the images, commands, and/or other data may be communicated in whole or in part via wire or wirelessly, including combinations thereof. Still other suitable means, modes, methods, and media of communication will be apparent to those of ordinary skill in the art.

The image capture and display system (2) is operable to capture and display any type of images, including video and still images in a wide range of light spectrums. As used herein, the term "video" generally means a sequence of still images from which motion can be discerned. Where such video is frame-based and has a frame rate, for example, the frame rate can vary widely. For instance, in many embodiments, the frame rate could be between 30 frames per second and one frame per second. Naturally, these are merely examples and the frame rate could be below or above this exemplary range. Accordingly, the phrase "video image" shall not be construed as requiring any particular refresh rate or image-changing frequency. Similarly, the phrase "video camera," including variations thereof, shall be read to include any type of device operable to capture video images. By way of example only, a video camera may be a digital video camera comprising a CMOS, CCD, or any other suitable type of image sensor. Alternatively, a video camera may be non-digital. Optionally, if a non-digital video camera is used, the image signal produced by such camera may be converted at some point during the process into digital form.

Figure 2:
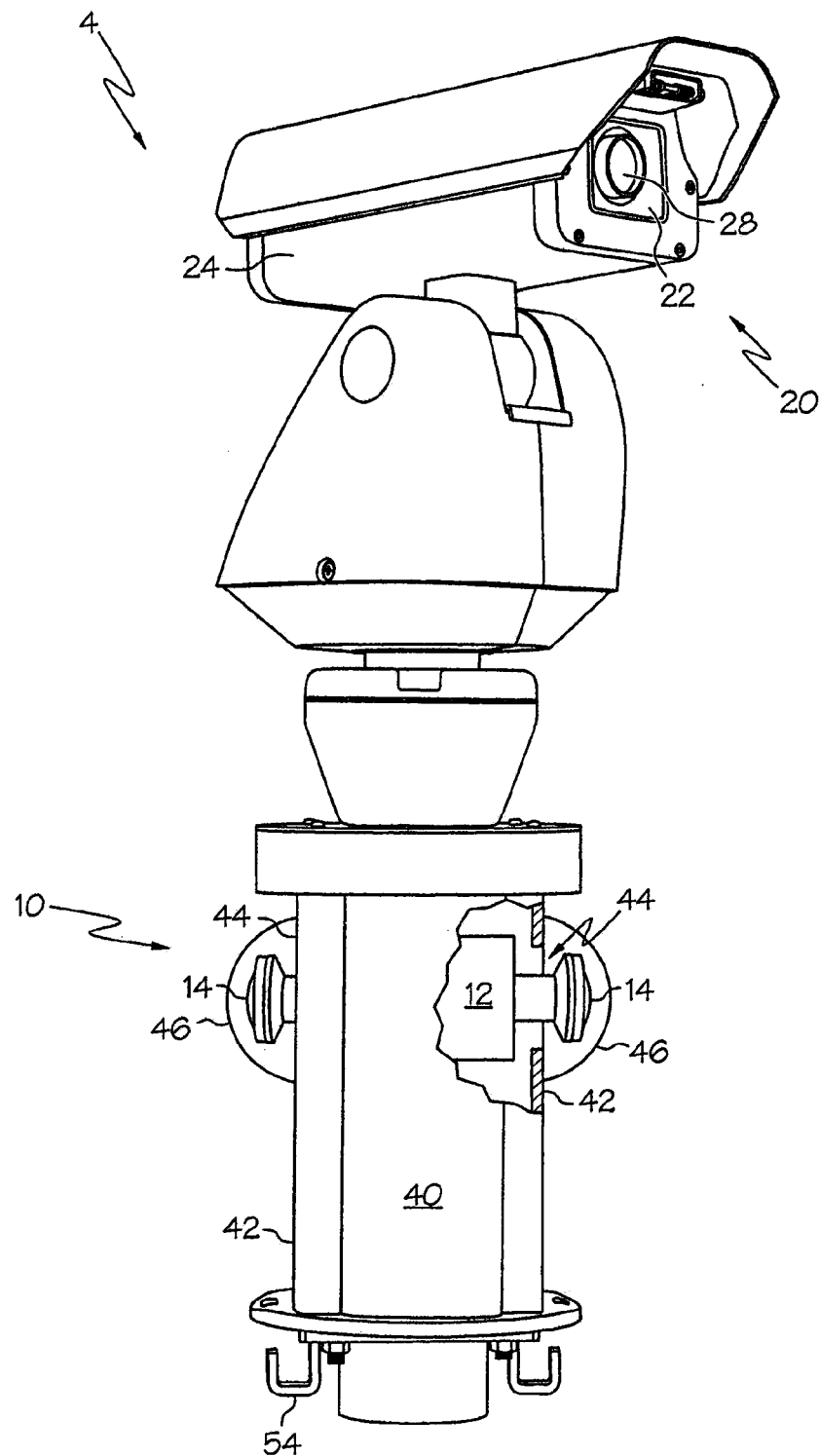
FIG. 2 depicts a perspective view of an image capture system.

FIG. 2 illustrates an image capture system (4) comprising an immersive camera system (10) and a PTZ camera system (20). In the present example, the immersive camera system (10) comprises two fisheye lenses (14) positioned back-to-back within a housing (40). In other words, the immersive camera system (10) of the present example comprises two oppositely facing fisheye lenses (14). In the present embodiment, each fisheye lens (14) may have at least a hemispherical field of view. Accordingly, the immersive camera system (10) provides a wide angle field of view of at least a portion of the environment in which the immersive camera system (10) is situated. Each fisheye lens (14) may have its own dedicated camera, or both lenses (14) may share the same camera. For instance, a video image could be captured with a shared camera by frames alternating between each lens (14), or each frame being shared by images captured from the two lenses (14).

Of course, the immersive camera system (10) may take a variety of forms, including but not limited to the number of cameras and types of lenses. By way of example only, the immersive camera system (10) may comprise a single camera (12) with a fisheye (14) or other wide angle lens; a plurality of cameras having non-fisheye wide angle lenses; a plurality of cameras having non-wide angle lenses, such as six cameras having 50 mm lenses; or a catadioptric system, such as one of the catadioptric systems disclosed in U.S. Pat. No. 6,215,519. Still other suitable configurations for the immersive camera system (10) will be apparent to those of ordinary skill in the art.

The phrase "fisheye camera" shall be read to include a camera (12) having a fisheye lens (14). Where the immersive camera system (10) includes back-to-back fisheye lenses (14), such as the immersive camera system (10) shown in FIG. 2, it will be appreciated that each of the lenses (14) may provide a field of view that is generally hemispherical. In the present example, the back-to-back hemispherical views provided by the fisheye lenses (14) provide a generally spherical field of view.

In one embodiment, the immersive camera system (10) provides an immersive view. As used herein, the term "immersive" shall be read to denote any extreme wide angle field of view. For instance, and without limitation, a field of view of 120° or greater in any one dimension is considered immersive. It will be appreciated that such a view may be provided by hemispherical, spherical, toroid, cylindrical, cubic, equirectangular, or other types of images, by way of example only. Thus, an "immersive image" is any still or video image having an immersive view. Accordingly, while the immersive camera system (10) of the present example is operable to provide a spherical field of view, it will be appreciated that other immersive views may also be used, and may be obtained by many types of immersive camera system (10) configurations.

The elongate housing (40) has a rigid circumferential wall (42) defining the interior and exterior of the housing (40). While the wall is described as "circumferential," that term should not be read as requiring the housing to have a circular cross section. By way of example only, the housing (40) may have a generally circular, square, rectangular, elliptical, or any other suitable cross section. Two ports (44) are positioned in the housing wall (42) and extend from the interior to the exterior of the housing (40). Each port (44) is generally normal to a centerline running along the interior of the housing (40). In addition, each port (44) is positioned 180° opposite the other port (44). A mounting structure is positioned in the interior of the housing (40) for mounting the fisheye camera(s) within the housing (40), such that each fisheye lens (14) is aligned with one of the ports (44). It will be appreciated that, while an elongate, generally cylindrical housing (40) is shown, a variety of other suitable types of housing (40) may be used to house the immersive camera system (10). As shown in FIG. 2, the housing (40) of the present example includes brackets (54) for mounting the image capture system (4) to a post (66). Alternatively, any other suitable housing (40) configurations or features may be used for mounting the image capture system (4).

The housing (40) includes a substantially transparent convex cover (46) positioned over each port (44), such that the covers (46) cover the fisheye lenses (14). In the present example, the lens covers (46) are constructed of a plastic material. However, it will be appreciated that any suitable material may be used. In the present example, the lens covers (46) have a radius such that they do not act as a lens element as light passes through to the lens (14). In one embodiment, the lens covers (46) have a curvature such that the cover is equidistant form the surface of the corresponding lens (14). It will be appreciated that the lens covers (46) may be configured such that they affect the optical properties of the immersive camera system (10). In such an alternative embodiment, to the extent that such an optical effect is undesirable, it will be further appreciated that such effects may be addressed through image processing. It will also be appreciated that the lens covers (46) may be coated with any material for protective or other purposes. By way of example only, the lens covers (46) may be coated with a material to provide a high surface energy for preventing buildup of rainwater and the like on the lens cover (46). Other suitable housing (40) configurations, including lens cover (46) configurations, will be apparent to those of ordinary skill in the art.

Where an immersive view is provided by the immersive camera system (10), it may be desirable to have the processor (6) perform perspective correction on the image before sending it to the user interface (8). For instance, where lines in an immersive image appear to be unnaturally bent or warped, or the image otherwise appears distorted relative to human perception, the image may be processed to create a perspectively corrected image. The appropriate perspective correction or dewarping technique may vary depending on the type of immersive camera, and many such techniques are well known in the art. For instance, in the case of fisheye immersive images, such perspective correction may be performed in accordance with the teachings of U.S. Pat. No. 5,185,667, or by other techniques known in the art. The perspective correction may be performed as to all or part of an immersive image. Thus, as used herein, the phrase "perspectively corrected immersive image," including variations thereof, shall be read to include, an immersive image where at least a portion of the immersive image has been perspectively corrected.

The PTZ camera system (20) in the present example comprises a pan-tilt-zoom (PTZ) camera (22) system mounted to the housing (40). In the present example, the PTZ camera (22) is positioned vertically above the immersive camera system (10). However, it will be appreciated that any suitable relative positioning of the immersive and PTZ camera systems (10, 20) may be used, and may be proximate or distant from one another. The orientation of the PTZ camera (22), such as the pan (e.g., horizontal orientation) and bit (e.g., vertical orientation) of the PTZ camera (22) by way of example only, can be controllable remotely by a user. In addition, the level of zoom of the PTZ camera (22) can be controllable remotely by the user. Accordingly, the PTZ camera system (20) of the present example is controllable by a user with respect to at least orientation and zoom. It will be appreciated that any aspect of movement and/or orientation of the PTZ camera (22) may be provided by any suitable assembly, such as cams, gears, gimbals, motors, pulleys, hydraulics, and the like, by way of example only.

It will be appreciated that the PTZ camera system (20) of the present example provides a field of view that is narrower than the field of view provided by the immersive camera system (10). Preferably, however, the field of view provided by the PTZ camera system (20) is of a portion of the environment that is within the field of view provided by the immersive camera system (10). Thus, the immersive camera system (10) provides a wide field of view of the environment, while the PTZ camera system (20) provides a narrow field of view of the environment, such that the narrow view is within the wide view.

While the figures show the PTZ camera system (20) as comprising a PTZ camera (22), the PTZ camera system (20) may take a variety of different forms, including but not limited to the number of cameras and types of lenses. By way of example only, the PTZ camera system (20) may comprise a plurality of PTZ cameras (22) or other cameras. Where the PTZ camera system (20) comprises a plurality of cameras, each of the cameras need not be controllable individually with respect to orientation and/or zoom. In such an embodiment, control may be effected, at least in part, by merely switching among views provided by cameras comprising the PTZ camera system (20). In another embodiment, the PTZ camera system (20) comprises a fixed camera aimed at a system of one or more moveable mirrors for changing the region viewed by the camera. Still other suitable configurations for the PTZ camera system (20) will be apparent to those of ordinary skill in the art.

Those of ordinary skill in the art will appreciate that the PTZ camera system (20) may comprise a combination of a digital zoom of the image captured by the immersive camera system (10), in addition to a PTZ camera (22). Such alternate embodiments of the PTZ camera system (20) may include a digital zoom of the image provided by the immersive camera system (10) to a point where resolution becomes unsatisfactory, at which point the PTZ camera (22) is oriented and zoomed to approximate the field of view of the digitally zoomed image, and the processor (6) switches the view sent to the user interface (8) to the view provided by the PTZ camera (22). Preferably, such switching will be relatively seamless (e.g., lacking substantial time delay).

Figure 3:
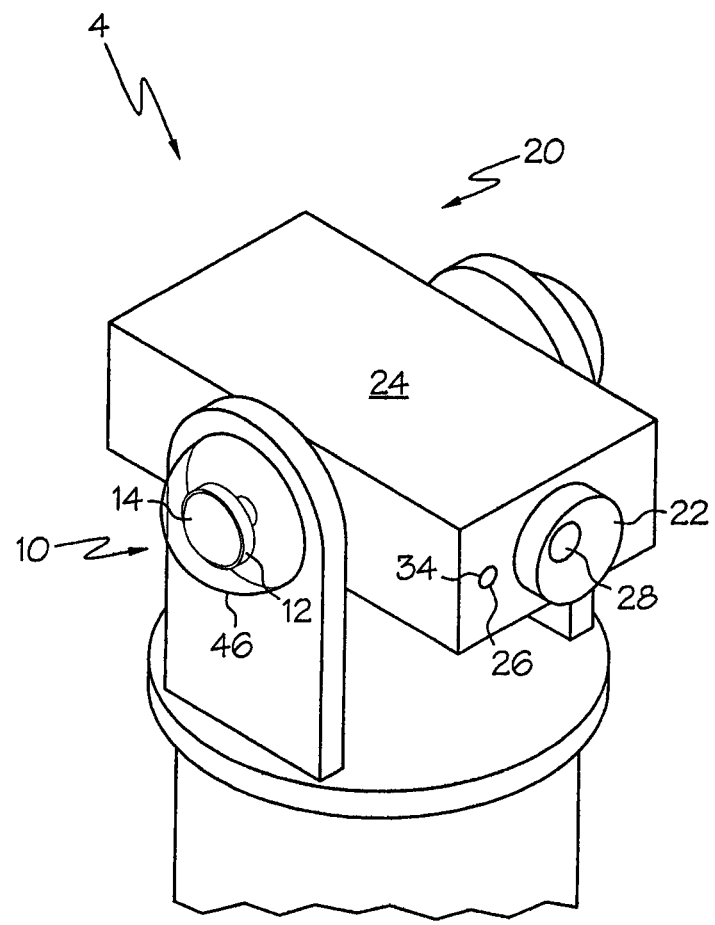
FIG. 3 depicts a perspective view of an alternative image capture system.

It will also be appreciated that the image capture system (4) may take a wide variety of forms with respect to the combination of the immersive camera system (10) and the PTZ camera system (20). Such alternative forms may include, but are in no way limited to, the embodiments depicted in FIGS. 3 through 5. By way of example only, an immersive camera system (10) having fisheye lenses (14) may be mounted to the sides of a PTZ camera (22), such as the system shown in FIG. 3. In this embodiment, the center line of sight for the PTZ camera (22) intersects the center lines of sight for the two fisheye lenses (14). As the PTZ camera (22) moves, the immersive image may be programmatically shifted and rotated to match the PTZ camera (22) movement, thereby reducing or eliminating orientation changes in the immersive image. Thus, while the immersive camera system (10) may be rotating and/or tilting relative to the environment, the immersive image viewed by the user will appear stationary. One advantage of the camera system example shown in FIG. 3 is that parallax between the PTZ camera (22) and immersive camera system (10) is reduced or eliminated.

Figure 4:
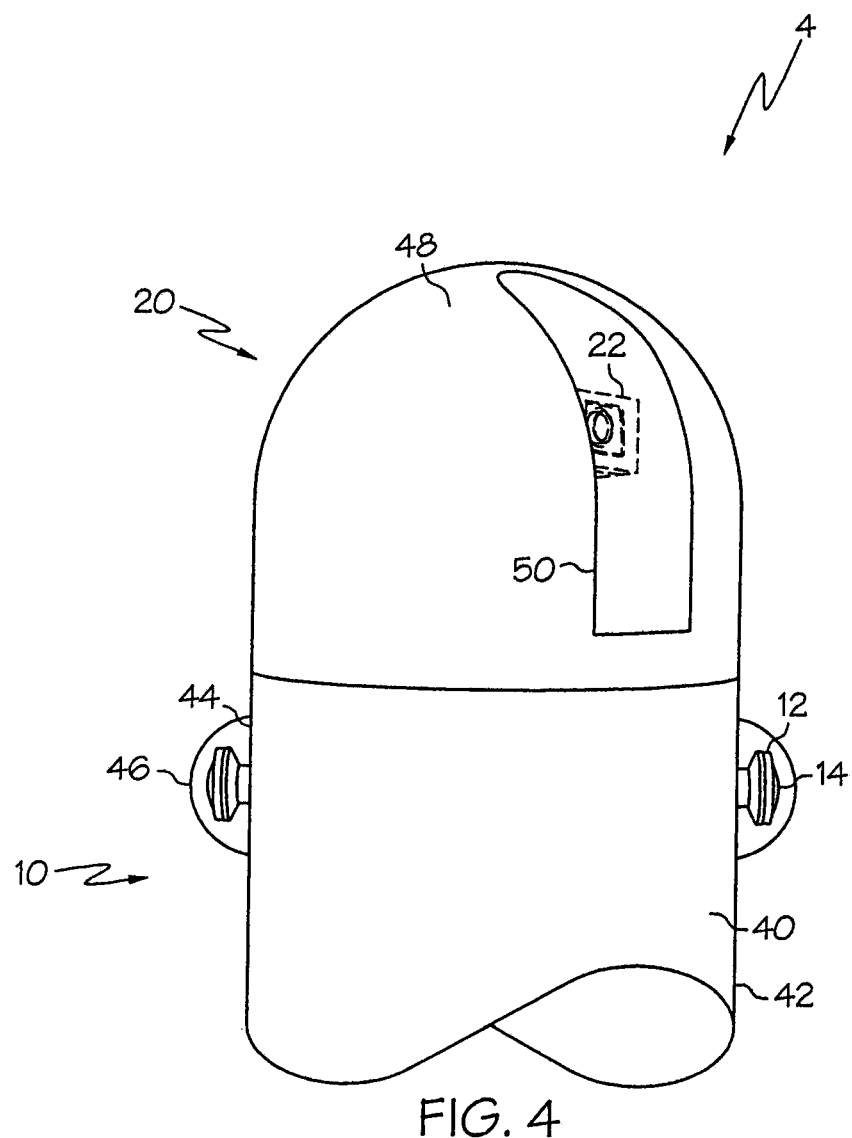
FIG. 4 depicts a perspective view of an alternative image capture system.

FIG. 4 shows an image capture system (4) where the PTZ camera (22) is enclosed within a generally dome-like housing (48) providing a slot (50) through which the PTZ camera (22) may view areas of interest within the environment. The slot (50) may be occupied or covered by a substantially transparent material. It will also be appreciated that the immersive camera system (10) and PTZ camera system (20) may be held within the same housing (40).

Figure 5:
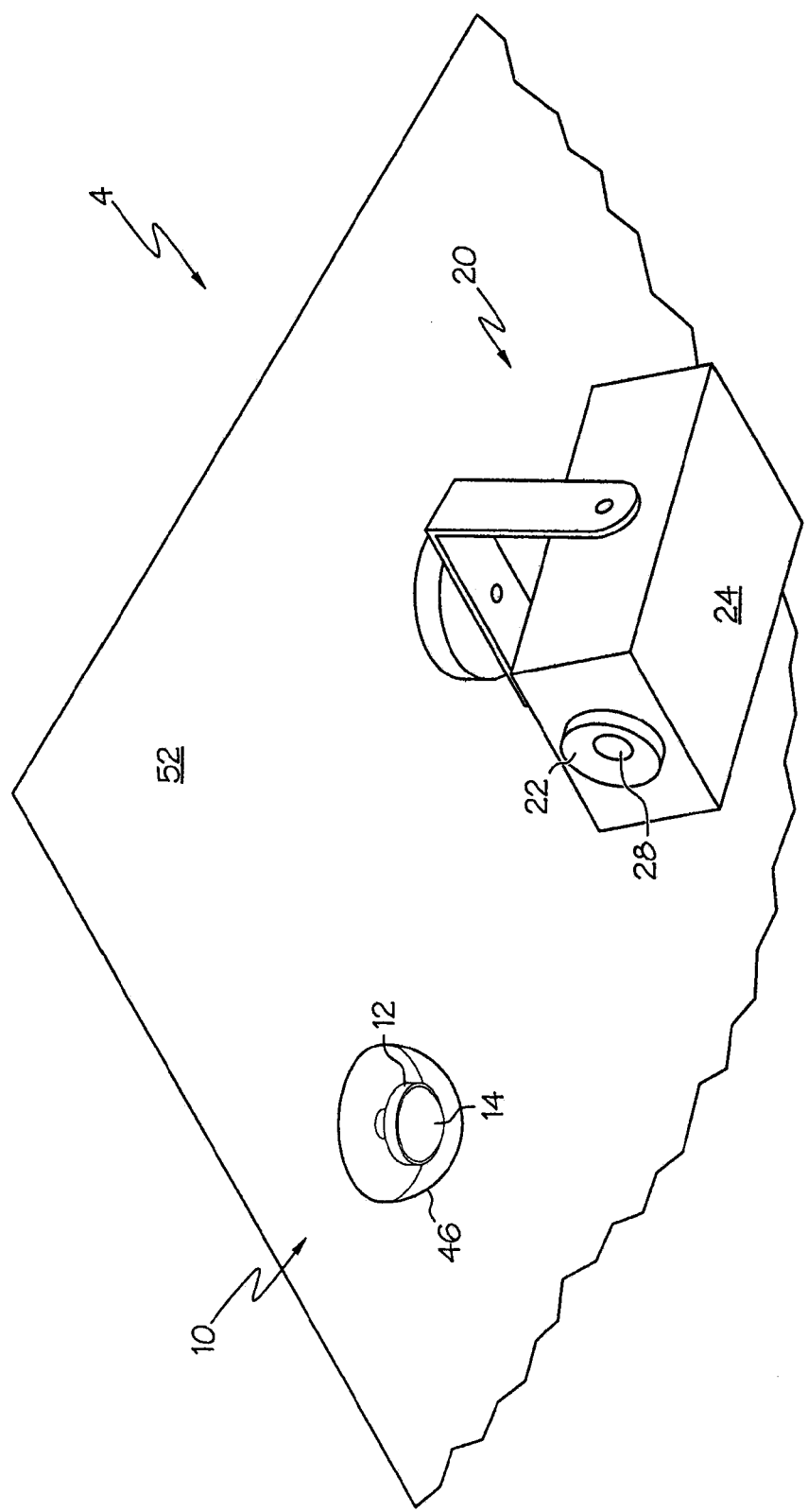
FIG. 5 depicts a perspective view of an alternative image capture system.

As shown in the embodiment depicted in FIG. 5, the immersive camera system (10) and PTZ camera system (20), may be physically separated. FIG. 5 shows a single camera (12) having a fisheye lens (14) mounted to a ceiling (52), with a PTZ camera (22) mounted nearby to the same ceiling (52). Of course, many other variations of image capture systems (4) may be used, as will be apparent to those of ordinary skill in the art. In addition, it will be appreciated that the image capture system (4) may comprise any number or types of cameras in any suitable positioning or combinations.

Figure 6:
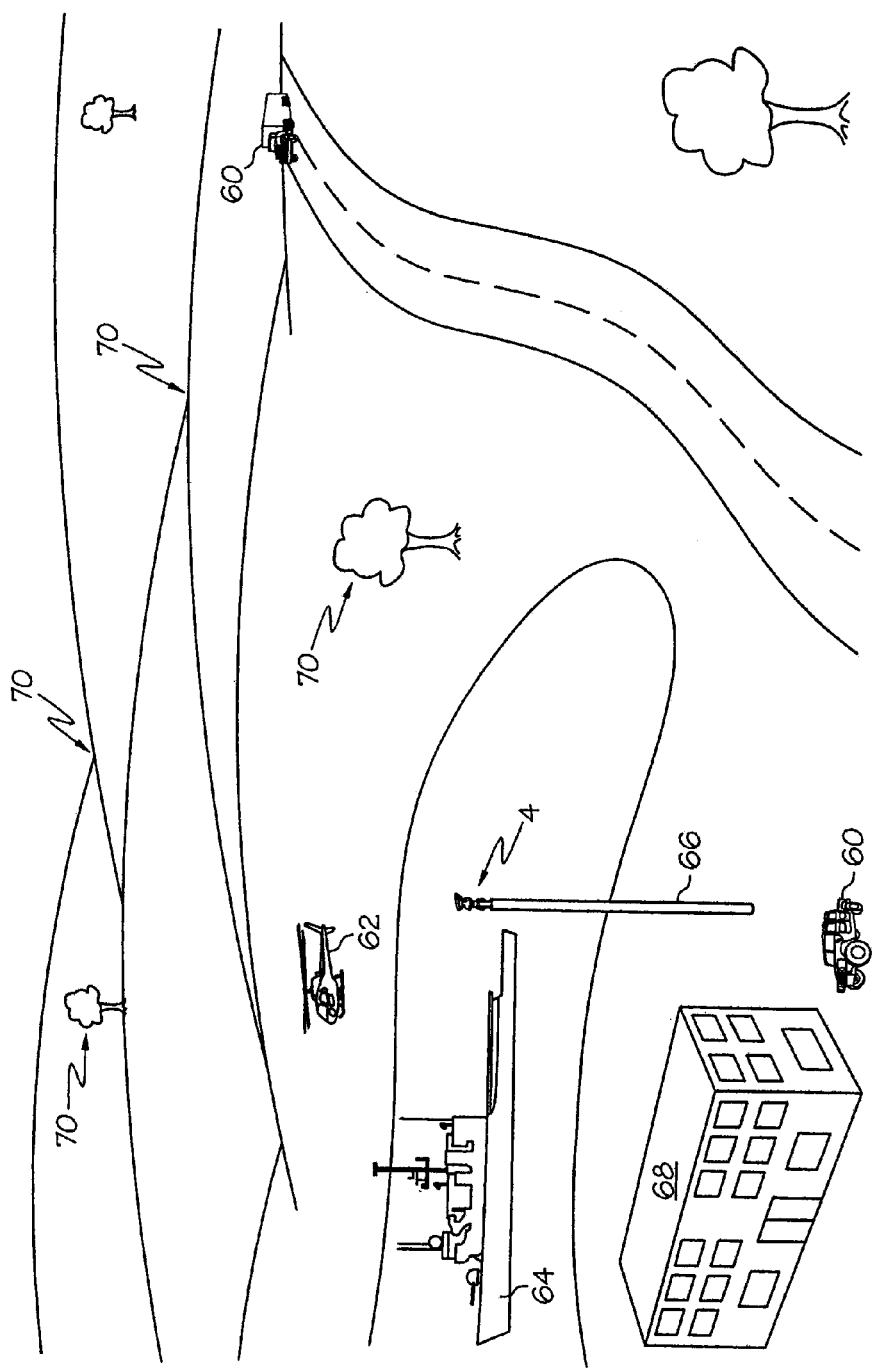
FIG. 6 depicts a perspective view of an environment with objects including the image capture system of FIG. 2.

It will also be appreciated that the image capture system (4), in whole or in part, may be mounted in a variety of locations and to a variety of platforms. As used herein, the term "platform" shall be read to include anything that the image capture system (4) may be mounted to. By way of example only, and with reference to FIGS. 6 and 7, the image capture system (4) may be mounted to a mobile platform such as a terrestrial vehicle (60), a flying machine (62), or a watercraft (64). Alternatively, the image capture system (4) may be mounted to a non-mobile platform, such as a post (66) or other man-made or natural structure, the top or side of a building (68), or to a platform within a building (68), such as a wall, ceiling (52), or floor, by way of example only. In addition, other suitable locations and platforms for mounting the image capture system (4) will be apparent to those of ordinary skill in the art. Of course, the image capture system (4) need not be mounted to a platform at all.

The image capture and display system (2) may further comprise one or more lasers (34). It will be appreciated that any suitable type or types of laser (34) or lasers may be used. By way of example only, one or more lasers (34) may be mounted to, or proximate to, the PTZ camera (22) or other camera. One of the lasers (34) may be oriented such that it is substantially aligned with or otherwise parallel to the line of sight of a PTZ camera (22) or other camera. In other words, the laser (34) may be oriented such that it points in the same direction in which the PTZ camera (22) is oriented. In one embodiment, and as shown in FIG. 3, the laser (34) is located within the same housing (24) as the PTZ camera (22), and the light emitted by the laser (34) passes through an opening (26) positioned proximate to the lens (28) of the PTZ camera (22). Other suitable orientations of lasers (34) will be apparent to those of ordinary skill in the art.

It will also be appreciated that one or more lasers (34) may be mounted or otherwise located anywhere, including locations separate from the PTZ camera (22) and/or housing (40) where the wide angle camera (12) or cameras are located. Nevertheless, even where a laser (34) is located separate from the PTZ camera (22) and/or housing (40) where the wide angle camera (12) or cameras are located, the laser (34) may be considered as being part of the image capture system (4). Other suitable locations for lasers (34) will be apparent to those of ordinary skill in the art.

The image capture and display system (2) may further comprise a variety of other devices. By way of example only, one or more Global Positioning System (GPS), Radio Frequency Identification (RFID), or other devices may be used to determine the positioning of all or part of the image capture and display system (2). In addition, or in the alternative, the image capture and display system (2) may include a motion detector (36). The motion detector (36) may trigger an alarm or other form of notice that motion has been detected in the environment. In one embodiment, activation of the motion detector (36) causes the frame rate of the displayed video image to speed up. The motion detector (36) may also be in communication with one or more of the cameras of the image capture system (4), such that the motion detector (36) triggers the capture of an image upon detection of motion, or such that the motion detector (36) causes a camera to automatically track an object moving within the environment. It will be appreciated that the motion detector (36) may be a conventional motion detector (36) in the form of a device that is physically separate from the one or more cameras of the system. Alternatively, a motion detector (36) may be effected through the processing of images provided by one or more of the cameras by known techniques, such as those of successive image/pixel comparison and the like. Other suitable forms and uses of motion detectors (36) will be apparent to those of ordinary skill in the art. It will also be appreciated that any type of sensor other than a motion detector (36) may be used for similar or other purposes.

The views provided by the immersive camera system (10) and the PTZ camera system (20) may be correlated through a variety of methods. Thus, the views from two or more cameras can be matched. For instance, where the views provided by the immersive camera system (10) and PTZ camera system (20) have been correlated, a user may choose an object or event of interest within the view provided by the immersive camera system (10), then command the PTZ camera system (20) to provide a view of the same object or event of interest. For shorthand purposes, the terms "object" and "event" will be used interchangeably and shall be read interchangeably and inclusive of plurals. Accordingly, the phrase "object(s) of interest" includes "event(s) of interest" and vice-versa.

Correlation may be performed in a manner that is dependent on the geography of the environment. Such geography-dependent correlation may be suitable where, for example, the distance between all or part of the image capture system (4) and an object in the environment is known and fixed and/or some geometric characteristic of the environment is constant (e.g., the floor or ground is always flat). However, correlation may also be performed in a manner that is independent of the geography of the environment. Such geography-independent correlation may be desired where the image capture system (4) will be mounted to a mobile platform or where the environment is dynamic (e.g., characteristics of the environment are subject to change, the ground or floor is not flat, the environment is otherwise unknown, etc.).

One challenge in correlating camera views may be accounting for parallax. It will be appreciated that a parallax effect may be encountered by having non-co-linear lines of sight among the plurality of cameras or camera systems. While the parallax effect, if not accounted for, may adversely affect the accuracy of correlation attempts, it will be appreciated that the impact of the parallax effect on correlation accuracy may be negligible or otherwise acceptable with respect to objects and events that are beyond a certain distance from the image capture system (4). For instance, where an image capture system (4) such as the one shown in FIG. 2 is mounted atop a 15-foot high post (66), the parallax effect may be negligible with respect to objects and events that are further than 40 feet away from the post (66). In certain applications it may be desirable to reduce or minimize parallax by moving the respective lines of sight closer together, while in other applications parallax may be acceptable or even desirable.

One technique to correlate the views of the immersive and PTZ camera systems (10, 20) is to essentially ignore the parallax effect. In this embodiment, the view or image provided by the immersive camera system (10) is mapped, such as by Cartesian, cylindrical, or spherical coordinates by way of example only. It will be appreciated that, because the map of this example will be of the image or view and not the environment, such mapping may be accomplished by knowing directional coordinates. When a user selects an object of interest within a view provided by the immersive camera system (10), the processor (6) determines or receives the coordinates corresponding to the line of sight direction. The PTZ camera system (20) may be correlated by using the same coordinates. This may be accomplished by "assuming" that the immersive and PTZ camera systems (10, 20) have the same point of origin, and orienting the PTZ camera system (20) such that its line of sight passes through the selected coordinates relative to the point of origin "shared" by the immersive and PTZ camera systems (10, 20). This approach may provide the user with a view from the PTZ camera system (20) that is "close enough" to the selected object of interest, such that the user may subsequently adjust the orientation of the PTZ camera system (20) as necessary or desired for a better view of the object of interest by any suitable means.

Another technique to correlate immersive and PTZ camera systems (10, 20) corrects the effects of parallax. In an embodiment of this technique, data points within the environment are collected and entered in a storage device (30) as correlation data (32). The correlation data (32) is referenced to correct the parallax effects or otherwise account for the parallax when the user selects an object of interest to be viewed by the PTZ camera system (20). The collection of data points may be performed at installation of the image capture system (4), by way of example only, and may be desirable where the image capture system (4) will remain in a fixed position relative to the environment during use. Each data point may be taken or collected by noting information relating to the position of an object ("data point object")—such as a landmark (70) or building (68) like those shown in FIGS. 6 and 7, by way of example only—in the environment relative to each camera or camera system in the form of coordinate sets ("data point coordinates") corresponding to each camera or camera system. It will be appreciated that the coordinates may be only two-dimensional, such that each data point coordinate set represents the direction for the corresponding data point object relative to the immersive or PTZ camera system (10, 20). Each data point coordinate set may also include a coordinate or coordinates representing the distance of a data point object relative to the camera systems (10, 20).

By way of example only, each data point object position may be noted by manually orienting the PTZ camera (22) to view the data point object (e.g., such that the data point object is at the center of the PTZ image or aligned with crosshairs), then clicking with a mouse on the data point object as depicted in the navigable immersive or equirectangular image (102, 100) captured by the immersive camera system (10). Such clicking may cause the system to note the data point coordinates relative to each camera system (10, 20). This noting may be accomplished by noting the point in the navigable immersive or equirectangular image (102, 100) on which the user clicked, while also noting the orientation of the PTZ camera (22) (e.g., the orientation of the line of sight of the PTZ camera (22)) at the time the user clicked.

However, to make the data point coordinates relative to the PTZ camera system (20) more accurate, the user may click on the data point object as depicted within the PTZ image (104) to note the corresponding coordinates relative to the PTZ camera system (20). Such clicking may replace or update the coordinates (relative to the PTZ camera system (20)) that were noted when the user clicked on the navigable immersive or equirectangular image (102, 100). This refining or updating may be desired when the user has difficulty in precisely centering the data point object within the PTZ image (104), by way of example only. Alternatively, it may be desired where the user has chosen to click or inadvertently clicked on a particular point within the immersive or equirectangular image (102, 100) that is not precisely at the center of the PTZ image (104). Still other possible situations in which it may be desirable to update or refine data point coordinates relative to the PTZ camera system (20) will be apparent to those of ordinary skill in the art.

In another embodiment, data point coordinate sets are predetermined with respect to the PTZ camera system (20), such that data point coordinate sets are collected only with respect to the immersive camera system (10) ("zero point calibration"). In this embodiment, the PTZ image (104) includes a crosshairs or other indicator within its center, representing the line of sight of the PTZ camera (22). With the PTZ camera (22) at an initial position, the user may visually determine the point in the environment over which the crosshairs or other indicator is located, then click on the location with the mouse in one of the images captured by the immersive camera system (10). In response to the click, the data point coordinates with respect to the immersive camera system (10) will be noted and associated with the corresponding position or data point coordinates with respect to the PTZ camera (22), then the system will position the PTZ camera (22) to the next predetermined orientation. These steps may be repeated several times until the desired number of data point coordinate sets have been collected.

It will be appreciated that, for zero point calibration, the number and positioning of the predetermined PTZ camera (22) orientations may be preprogrammed or set by the user. While the word "predetermined" is used to describe orientations of the PTZ camera (22) during zero point calibration, it is meant to include PTZ camera (22) orientations that are selected at random. It will also be appreciated that the data point coordinate sets for the PTZ camera system (20) may correspond with the predetermined orientations, such that data point coordinate sets need not be "collected." In zero point calibration, data point objects may typically be arbitrary (e.g., whatever the PTZ camera (22) happens to be pointing at when positioned at one of the predetermined orientations). Where a crosshairs or other indicator is used for zero point calibration, such an indicator may be displayed only during this process. Suitable variations of zero point calibration will be apparent to those of ordinary skill in the art.

A data point object may be provided by a spot of light or other detectable reference provided by a laser (34) that is positioned in close proximity to the PTZ camera (22) and oriented substantially parallel to the line of sight of the PTZ camera (22). In this embodiment, the PTZ camera (22) is manually or automatically oriented in several different orientations at arbitrary or other time intervals. For each of these different orientations, the user may find the corresponding spot of light as shown in the navigable immersive or equirectangular image, and click on the depicted spot of light to note the coordinates. In one embodiment, the click causes the processor (6) to note the location of the click in the navigable immersive or equirectangular image as the location of the data point object relative to the immersive camera system (10), while simultaneously noting the orientation of the PTZ camera system (20) as the location of the data point object relative to the PTZ camera system (20).

In one embodiment, the immersive camera system (10) includes a filter within the optical path of the immersive camera system (10) to assist in the visual detection or otherwise facilitate detection of the spot of light provided by the laser (34) on objects in the environment as depicted in the image provided by the immersive camera system (10). By way of example only, the filter may be an optical band-pass filter, a narrow band filter, or any other suitable filter. Preferably, the filter will pass the wavelength of the light provided by the laser (34) such that the detectable reference has sufficient contrast to be detected automatically. In addition, the filter or filters will preferably be behind one or more lenses (14) of the immersive camera system (10), although the filter may be positioned within or in front of a lens (14). There will also preferably be a device or method for selectively applying the filter, such as, by way of example only: a mechanical device for placing it in front of or behind a lens, and subsequently removing it; an electronic device for activating and deactivating the filter; or any other suitable means for selectively applying the filter.

As an alternative to the manual data point coordinate collection discussed above, and particularly where a filter is used, the system may automatically collect the data point coordinates by automatically orienting the PTZ camera (22) (and, hence, the laser (34)) in different orientations and automatically noting the corresponding location of the spot of light within the view(s) of the immersive camera system (10). Ways of automatically detecting the spot of light within the view(s) of the immersive camera system (10) will be apparent to those of ordinary skill in the art. Alternatively, a laser (34) and/or filter may be used to facilitate zero point calibration discussed above, including variations thereof.

Thus, in the present example, each data point object will have a set of data point coordinates corresponding to its location relative to the immersive camera system (10), and a set of data point coordinates corresponding to its location relative to the PTZ camera system (20). As with the mapping discussed above, the data point coordinates may be of any suitable coordinate system, such as Cartesian, spherical, and the like. However, it may be desirable to collect the coordinates representing all three dimensions. The data point coordinates may be compiled and stored as correlation data (32) in the storage device (30), by way of example only. After a suitable number of data point coordinate sets have been obtained and stored, the processor (6) may reference the correlation data (32) when a user selects an object of interest within the view provided by the immersive camera system (10) to be viewed by the PTZ camera system (20). Through interpolation or extrapolation with the correlation data (32), the processor (6) may correlate the view of the PTZ camera system (20) to the view of the immersive camera system (10), such that the PTZ camera system (20) provides the desired view of the selected object of interest. While this type of correlation may be suitably accomplished with but a few data points, it will be appreciated by those of ordinary skill in the art that the accuracy of the correlation may increase with the number of data point coordinate sets obtained. It will also be appreciated that this method of correlation may be suitable for situations where at least parts of the immersive and PTZ camera systems (10, 20) are not physically located in close proximity to each other. However, closer proximity of the immersive and PTZ camera systems (10, 20) may lead to less parallax, and reduce the number of data point coordinate sets to be collected.

Similarly, it will be appreciated that a laser (34), such as a laser range finder, or other correlation apparatus may be used to map the environment or create a three dimensional model of the environment, which may be represented by data stored in the storage device (30) for reference. This map or model would preferably include the position of both the immersive and PTZ camera systems (10, 20). Like the correlation data (32) described above, the map or model may be referenced by the processor (6) in response to user input indicating an object of interest in the depicted environment to be viewed by the PTZ camera system (20). By determining the position of the object of interest on the map or in the model, the processor (6) may orient the PTZ camera system (20) for viewing the selected object of interest. Still other suitable methods of obtaining and/or using maps and/or models of the environment, including the use of alternative correlation apparatuses, will be apparent to those of ordinary skill in the art.

Another exemplary method by which the views of the immersive and PTZ camera systems (10, 20) may be correlated includes using object recognition algorithms, such as pattern correlation to identify data point objects.

Another exemplary method by which the views of the immersive and PTZ camera systems (10, 20) may be correlated includes using a laser (34) and filter to determine the current orientation of the PTZ camera system (20) in order to "manually" orient the PTZ camera system (20) to view an object of interest ("the laser-filter method"). In this embodiment, the laser (34) is positioned such that it is aligned or is otherwise parallel with the line of sight provided by the PTZ camera system (20). The immersive camera system (10) includes a filter within the optical path of the immersive camera system (10) for easier viewing of the detectable reference provided by the laser (34) on locations in the environment. By way of example only, the filter may be an optical band-pass filter, a narrow band filter, or any other suitable filter. Preferably, the filter will pass only the wavelength of the light provided by the laser (34), or at least a very narrow band of wavelengths surrounding the wavelength of the light provided by the laser (34). In addition, the filter or filters will preferably be behind one or more lenses (14) of the camera(s) (12) of the immersive camera system (10), although the filter may be positioned within or in front of a lens (14). There will also preferably be a device or method for selectively applying the filter, such as, by way of example only: a mechanical device for placing it in front of or behind a lens, and subsequently removing it; an electronic device for activating and deactivating the filter; or any other suitable means for selectively applying the filter.

It will be appreciated that the laser (34) may be operated in any suitable fashion, such as by being on continuously, by way of example only. Alternatively, where there exits a means for selectively activating or applying the filter, the image capture and display system (2) may be configured such that the laser (34) is activated (e.g., turned on) substantially contemporaneously with the filter being activated, with the laser (34) being deactivated (e.g., turned off) substantially contemporaneously with the filter being deactivated. Still other suitable relationships between laser (34) operation and filter activation/application will be apparent to those of ordinary skill in the art. In addition, it will be appreciated that any suitable correlation apparatus or apparatuses may be used as an alternative to the laser (34) and/or filter.

The laser-filter method, including variations thereof, may be performed by a user first viewing the wide angle image provided by the immersive camera system (10). Upon detecting an object of interest within the wide angle image, the user may activate the filter. The laser (34) will also be activated. With the laser (34) and filter activated, the spot of light or other detectable reference provided by the laser (34) will preferably appear clearly on the wide angle image provided by the immersive camera system (10). Upon seeing the light provided by the laser (34), which will indicate the line of sight of the PTZ camera system (20), the user may manually orient the PTZ camera system (20) to make the spot of light approach the object of interest, such that the object comes within the field of view of the PTZ camera system (20). This manual orientation may be done with the laser (34) on and the filter activated, thereby permitting the user to track the motion of the PTZ camera system (20) by detecting the position and watching the motion of the laser light in one of the wide angle images provided by the immersive camera system (10). The manual orientation may be performed using any suitable method or device, such as a joystick, mouse, keypad, or touch screen, by way of example only. When the object of interest is within the field of view of the PTZ camera system (20), the filter and laser (34) may be deactivated. It will be appreciated that the processor (6) may further include a program to provide an indicator within one of the wide angle images showing the position of the light provided by the laser (34) to assist the user in detecting the laser light. By way of example only, the program may superimpose an arrow or other indicator showing the location of the laser light within the image provided by the immersive camera system (10).

In another embodiment of the laser-filter method, correlation is automated, in part, through the use of a real-time feedback loop. The user indicates a point or region of interest within the navigable immersive or equirectangular image (102, 100), such as by clicking with a mouse. Then, the laser (34) and filter are activated, and the system detects the position of the spot of light or other detectable reference provided by the laser (34) within the image (102, 100) on which the user clicked. The system compares this position of the spot of light to the position of the point or region of interest indicated by the user. The system may then change the orientation of the PTZ camera (22). After the orientation of the PTZ camera (22) has been changed, or while the orientation is changing, the system may again detect the position of the spot of light, and again compare this position to the position of the point or region of interest indicated by the user. This process may be repeated until the system determines that the position of the spot of light is sufficiently on or within the position of the point or region of interest indicated by the user. During this process, the filter may be repeatedly activated and deactivated at a predetermined frequency. This frequency may be synchronized with activation and deactivation of the laser (34). While the filter may alternatively remain activated throughout the correlation, the repeated activation and deactivation may be desired for purposes such as maintaining image quality (100, 102), by way of example only.

In one variation, the views of the immersive and PTZ camera systems (10, 20) are initially roughly correlated by essentially ignoring the parallax effect, as described above. This initial correlation occurs when the user indicates a point or region of interest within the navigable immersive or equirectangular image (102, 100), such as by clicking with a mouse, thereby providing an initial command to orient the PTZ camera (22). The system then engages in the laser-filter method using the feedback loop described above to account for the parallax.

The laser-filter method, including variations thereof, is merely one example of how correlation may be performed dynamically and in "real-time." Other variations of the laser-filter method will be apparent to those of ordinary skill in the art. In addition, by using the laser-filter method and its variants, correlation data (e.g., data point coordinates) need not be collected. Thus, the laser-filter method, including variations thereof, may be particularly suitable in applications where the relative view of the environment is subject to change, such as where at least a part of the image capture system (4) is mounted to a mobile platform.

It will also be appreciated that, where a laser (34) is aligned or otherwise parallel with the line of sight of the PTZ camera system (20), and the distance of separation between the immersive and PTZ camera systems (10, 20) is known, the location of an object of interest may be computed using straightforward trigonometry. Such a determined location may be used for a variety of purposes, including but not limited to archival or weapon-targeting purposes, or dispatch of personnel or objects to the location.

Another exemplary method by which the views of the immersive and PTZ camera systems (10, 20) may be correlated in "real-time" includes using a correlation apparatus, such as a laser range finder by way of example only, to determine a vector to an object or event of interest in the environment, then using trigonometry where the relative positioning of the immersive and PTZ camera systems (10, 20) is known or can be obtained. In this exemplary embodiment, relative positioning of the immersive camera system (10), the PTZ camera system (20), and the laser range finder is preferably known or determinable. Where a user selects an object of interest in an image provided by the immersive camera system (10), the selection is communicated to the processor (6) via the user input. Knowing the relative positioning of the immersive camera system (10) and the laser range finder, the processor (6) may issue a command to the laser range finder to determine a vector to the object of interest. In response, the laser range finder may determine the vector and communicate the vector to the processor (6). Knowing the relative positioning of the laser range finder and the PTZ camera system (20), the processor (6) may then use this vector to issue a command to the PTZ camera system (20) to provide a view of the selected object of interest. It will be appreciated that this method may be particularly suitable for embodiments in which the immersive and PTZ camera systems (10, 20) and the laser range finder include GPS or similar devices. In this embodiment, the immersive camera system (10), PTZ camera system (20) and laser range finder may all be at any distance from each other. It will also be appreciated that the vector may be communicated to a weapon-targeting system or other system, or to a storage device or other user, by way of example only.

In light of at least the foregoing, those of ordinary skill in the art will appreciate that there exist various methods by which the views of the immersive and PTZ camera systems (10, 20) may be correlated. Suitable methods include, but are not limited to, those described above. Suitable methods further include combinations, permutations, and variations of the methods described above. Alternative correlation devices, including correlation instruments, apparatuses, and combinations thereof, will also be apparent to those of ordinary skill in the art. It will also be appreciated that, while correlation has been discussed above in the context of correlating views of camera systems (10, 20) within the same image capture system (4), correlation may also be performed among two or more image capture systems (4), including but not limited to correlating the view of the immersive camera system (10) of a first image capture system (4) with the view of a PTZ camera system (20) of a second image capture system (4).

There are various ways in which the images and/or other data obtained by the image capture system (4) may be presented to a user. Such presentation may be through a user interface (8), which may comprise a display and a means for receiving one or more user inputs. Several merely exemplary display variations are depicted in FIG. 8. As shown, the display may comprise a single viewing device, such as a single monitor as shown in FIGS. 8A and 8C through 8E by way of example only; or a plurality of viewing devices, such as the three monitors shown in FIG. 8B by way of example only. Preferably, regardless of the number of viewing devices, at least two simultaneous images are displayed comprising at least one view provided by the immersive camera system (10) and at least one view provided by the PTZ camera system (20). Of course, the display may provide a single image at a time. It will also be appreciated that, where the display is provided in a windows-based environment, the images may be presented in a single window, or each image may be presented in its own window. Alternatively, the images may be presented in any combinations in more than one window.

The display illustrated in FIG. 8A provides three views to the user, and may be used where the image capture system (4) comprises an embodiment similar to the one shown in FIG. 2, by way of example only. It will be appreciated, however, that a display such as that shown in FIG. 8A may be used where the image capture system (4) is in any other suitable form or configuration. At the bottom half of the monitor screen, the display of FIG. 8A displays an equirectangular image (100) from an immersive view of the environment captured by the immersive camera system (10). As used herein, the term "equirectangular" shall be read to include any image that is generally rectangular, and represents a field of view with a span of approximately 360° in the horizontal, and span that is less than or equal to approximately 180° in the vertical. Alternatively, "equirectangular" may include any image that is generally rectangular, and represents a field of view with a span of approximately 360° in the vertical, and span that is less than or equal to approximately 180° in the horizontal. It is well-known to one with ordinary skill in the art how to convert spherical immersive images into equirectangular format.

The upper left-hand corner of the display provides a navigable immersive image (102). In the present example, this immersive image (102) has a spherical field of view. By the image being "navigable," as that term is used herein, only a region of the immersive image (102) is displayed at a given time, in accordance with user navigation input. In other words, the user may navigate the immersive image (102) to select the region in the immersive image (102) to be displayed. For instance and without limitation, such navigation may essentially simulate pan and/or tilt in the immersive image. Accordingly, a navigable aspect of an immersive image (102) provides a user the ability to selectively view regions of the immersive image as though the user were controlling a PTZ camera (22), by way of example only. Preferably, the selected portion of the immersive image (102) may be processed for perspective correction, such that the displayed image is a perspectively corrected immersive image. It will be appreciated that a navigable image may be navigated manually (e.g., through the user navigation input), or may be navigated per a preprogrammed sequence (e.g., automatic panning).

The upper right-hand corner of the display provides an image (104) of the view obtained by the PTZ camera system (20), such as the PTZ camera (22) in the present example. Accordingly, this image will be referred to herein, for illustrative purposes only, as the PTZ image (104). The corresponding user input comprises commands for the PTZ camera system (20), such as PTZ commands. Such commands comprise commands for orienting and/or controlling the level of zoom of the PTZ camera system (20). In other words, the user may orient the PTZ camera system (20), such as the PTZ camera (22), through one of the user inputs. Such commands or instructions may be communicated through the processor (6), which may perform a correlation process then issue a command to the PTZ camera (22). The PTZ camera (22) may thereby be oriented in response to the command to provide a view of the corresponding region of interest in the form of an oriented PTZ image (104).

In one embodiment, the user input for commanding the PTZ camera system (20) comprises a pointing device, such as a mouse by way of example only. The pointing device may be operable to move an indicator within one of the wide angle images. The indicator may be an arrow, crosshairs, dot, box, or any other suitable indicator. When the pointing device is a mouse, and the indicator is an arrow that is movable on the screen with the mouse, the user may indicate a region of interest by clicking on the mouse when the arrow is positioned within the region of interest as depicted in one of the wide angle images (100 or 102). Such user input will be communicated to the processor (6) for orienting the PTZ camera system (20) to capture an image corresponding to the region of interest indicated by the user input.

Thus, the user may orient the PTZ camera (22) by clicking on or near an object of interest in the equirectangular image (100) or in the navigable immersive image (102) to indicate a point or region of interest. If desired, the user may subsequently re-orient the PTZ camera (22) using the display. Alternatively, the user input may comprise any other suitable user input device or control for orienting the PTZ camera (22), such as a joystick or microphone for vocal commands by way of example only. The user may also zoom in or zoom out with the PTZ camera (22) using any suitable device for accomplishing the same. Suitable variations of software, hardware, and combinations thereof for effecting PTZ commands will be apparent to those of ordinary skill in the art.

In one embodiment, the user input for orienting and/or zooming the PTZ camera system (20) comprises the use of a mouse to create, move, and/or re-size a box enclosing a rectangular or other region of interest within the navigable immersive (102) and/or equirectangular image (100). As used herein, the phrase "region of interest" includes any region of an image in which an object of interest is located. In this embodiment, the user may delineate a region of interest in the navigable immersive (102) and/or equirectangular image (100) by moving a pointer with a mouse to a corner of the region of interest within the image. The user may then push a button on the mouse, then move the mouse with the button depressed until the pointer reaches the opposite corner of the region of interest. The box will be created when the user releases the button on the mouse, and will be defined by the opposite corners thus indicated. In response to the creation of the box (as a user input), the processor (6) may orient the PTZ camera system (20) to provide a PTZ image (104) of the delineated region of interest. In addition to the positioning of the box defining or effecting the orientation of the PTZ camera system (20), the size of the box may serve to define or effect the desired zoom level of the PTZ camera system (20). The user may delineate another region of interest by following the same steps.

Alternatively, a box or other indicator (108) corresponding to the region being viewed by the PTZ camera system (20) may always be present on the navigable immersive (102) and/or equirectangular image (100). In this embodiment, the user may orient the PTZ camera system (20) by clicking on the region within the box and "dragging" it with a mouse, as is known in the art. Similarly, the user may control the zoom level of the PTZ camera system (20) by re-sizing the box (108), such as by clicking on an edge of the box and "dragging" it with a mouse, as is known in the art. Still other suitable configurations for effecting control of the PTZ camera system (20) with a box will be apparent to those of ordinary skill in the art.

Accordingly, the user interface (8) comprises a display and user inputs. The display may comprise any suitable video display or displays. The user inputs may comprise immersive navigation and PTZ commands. The user inputs may be part of the display, separate therefrom, or both.

As previously stated, as an alternative to using the equirectangular image (100) for user input for commanding the PTZ camera (22), or in addition thereto, the display may permit the user to orient the PTZ camera (22) through the navigable immersive image (102). Preferably, in this embodiment, the user input for navigating the navigable immersive image (102) will differ from the user input for commanding the PTZ camera (22). By way of example only, the PTZ command input may be through the mouse, with immersive navigation input being through arrow keys on a keyboard. Other suitable user input forms and combinations will be apparent to those of ordinary skill in the art.

As illustrated in FIG. 8B, the three images (100, 102, 104) shown in the display of FIG. 8A may alternatively be presented on three separate screens or viewing devices. It will be appreciated that the three screens may be arranged in any suitable order. It will also be appreciated that the images (100, 102, 104) may be provided on any suitable number of screens, and in any suitable combinations within a given screen.

As illustrated in FIG. 8C, the display may comprise three immersive images (102), in addition to the PTZ image (104). Where the immersive camera system (10) comprises a pair of back-to-back cameras (12) having fisheye lenses (14), by way of example only, the three immersive images (102) may be derived from the views obtained by the two cameras (12). Alternatively, the immersive camera system (10) may comprise three pairs of back-to-back cameras (12) having fisheye lenses (14), such that each immersive image (102) is derived from the views obtained by one of the pairs. Other suitable configurations will be apparent to those of ordinary skill in the art. Each immersive image (102) may be navigable, non-navigable, or combinations thereof. By way of example only, each immersive image (102) may present a different, non-navigable view that spans approximately 120°. Alternatively, each immersive image (102) may be navigable dependently or independently with respect to the other immersive images (102). Where each immersive image (102) is navigable dependently, the navigation of one immersive image (102) may effect a navigation of the other immersive images (102), such that the system prevents the same view from being provided in more than one immersive image (102) at a given moment. Where each immersive image is navigable independently, navigation of one immersive image (102) may not affect the view provided by another immersive image (102) in the display. Other suitable relationships, features, and configurations of the immersive images (102) will be apparent to those of ordinary skill in the art. Preferably, at least one if the immersive images (102) provides a PTZ command input, such that an object of interest within an immersive image (102) may be indicated by the user for orienting the PTZ camera (22) to provide a view of the same. In other words, upon detecting an object of interest within one of the immersive images (102), the user may click on the object or otherwise indicate the object. In response, the processor (6) will command the PTZ camera (22) to be oriented to provide a view of the object of interest. Of course, any other suitable PTZ command input may be used.

The display illustrated in FIG. 8D may be used in an image capture and display system (2) where the PTZ camera system (20) includes a plurality of PTZ cameras (22), by way of example only. As shown, an immersive image (102) is presented in the upper left-hand corner. The immersive image (102) may be navigable or non-navigable. The remainder of the display includes a PTZ image (104) from each PTZ camera (22) of the system. In this embodiment, PTZ commands may be input through the immersive image (102), or through any other suitable input device. When an object of interest has been indicated, the PTZ images (104) may provide views of the object from different angles. Where one or more of the PTZ cameras (22) are incapable of viewing the particular object of interest for whatever reason ("blind PTZ"), the blind PTZ may simply not respond to the command. Alternatively, the blind PTZ may provide the closest view of the object of interest as possible. While three PTZ images (104) are shown, it will be appreciated that any number of PTZ images (104) may be displayed. Such number may bear any or no relation to a number of PTZ cameras (22) or other variations of the PTZ camera system (20) within the image capture system (4).

The display illustrated in FIG. 8E is similar to the display illustrated in FIG. 8A, with added indicators (106, 108). The equirectangular image (100) includes a navigable immersive indicator (106) and a PTZ indicator (108), while the navigable immersive image (102) includes a PTZ indicator (108). The immersive indicator (106) in the equirectangular image (100) shows the region of the environment being currently viewed in the navigable immersive image (102). It will be appreciated that, as the immersive image (102) is navigated, the navigable immersive indicator (106) will move within the equirectangular image (100) to follow the navigation. Similarly, the PTZ indicator (108) shows the region being currently viewed by the PTZ camera (22). A PTZ indicator (108) may be shown in both the equirectangular image (100) and the navigable immersive image (102), or just one of the two images. As with the navigable immersive indicator (106), the PTZ indicator (108) may move within the image(s) to follow movement of the PTZ camera (22). In one embodiment, the PTZ indicator (106) is shown as a box. It will be appreciated that, for purposes of accuracy, the box may not comprise straight lines and/or right angles. Alternatively, the box may represent an approximation of the area being viewed by the PTZ camera (22), and thereby comprise straight lines and right angles. The PTZ indicator (108) may also reflect the level of zoom of the PTZ camera (22). In the box embodiment, the box may increase in size as the PTZ camera (22) zooms out, and decrease in size as the PTZ camera (22) zooms in. As an alternative to a box, a crosshairs or other indicator (108) may be imposed upon the navigable immersive (102) and/or equirectangular image (100). Alternatively, the navigable immersive (102) and/or equirectangular image (100) may be presented in color, with the region corresponding to the view of the PTZ camera system (20) being indicated in black and white (or vice-versa). Of course, any other suitable indicator (108) may be used. Where both a navigable immersive indicator (106) and a PTZ indicator (108) are used, differentiation may be provided by making the indicators (106, 108) different colors, making one of solid lines and the other of dotted lines, or by using any other suitable distinguishing feature(s).

While not shown in the Figures, the display may optionally include additional visual representations of any information. By way of example only, the display may include a listing of any or all accessible camera systems, and provide a user the ability to select any camera system from that listing for displaying images capture thereby. It will also be appreciated that the image capture and display system (2) may be time-programmed, such that one or more cameras are set to capture images during certain frames of time. In this embodiment, the display may provide a user the ability to program the system for such operation, and may further display information relating to operation times before, during, and/or after such programming. Notwithstanding time-programming, it will be appreciated that one or more of the displayed images may include a notation relating to the time at which the corresponding image was captured, such as current time for current images, or previous times for images previously recorded, by way of example only.

It will also be appreciated that the display may display recorded images separately from images currently being captured. Such recorded images may be separate in any suitable way, such as by being in a separate frame, separate window, or on a separate viewing device by way of example only.

In another embodiment, the display displays a map of at least a portion of the environment in which at least a portion of the image capture system (2) is located. The location of all or part of the image capture system (2) may be indicated on the map. Where such a map is used in a system similar to the one depicted in FIG. 7, where several image capture systems (2) are used, the map may provide a user input for selecting image capture systems (2) whose captured images are to be displayed. In one embodiment, such user input may be provided by the user clicking on the location of the desired image capture system (2) as depicted in the map with a mouse or other device. In another embodiment, each image capture system (2) has a distinct indicator on the map, such that the user input may comprise clicking on a corresponding distinct indicator within a listing displayed near the map. Maps may be displayed in any suitable way, such as in a separate frame on the same viewing device as one or more of the images, in a separate window on the same viewing device as one or more of the images, or on a viewing device that is separate from the viewing device(s) on which the images are being displayed, by way of example only. Other suitable forms, contents, uses, and ways of displaying maps will be apparent to those of ordinary skill in the art.

Where zero point calibration is used, the display may include a display of a progress bar indicating the users progress in the zero point calibration progress.

Figure 7:
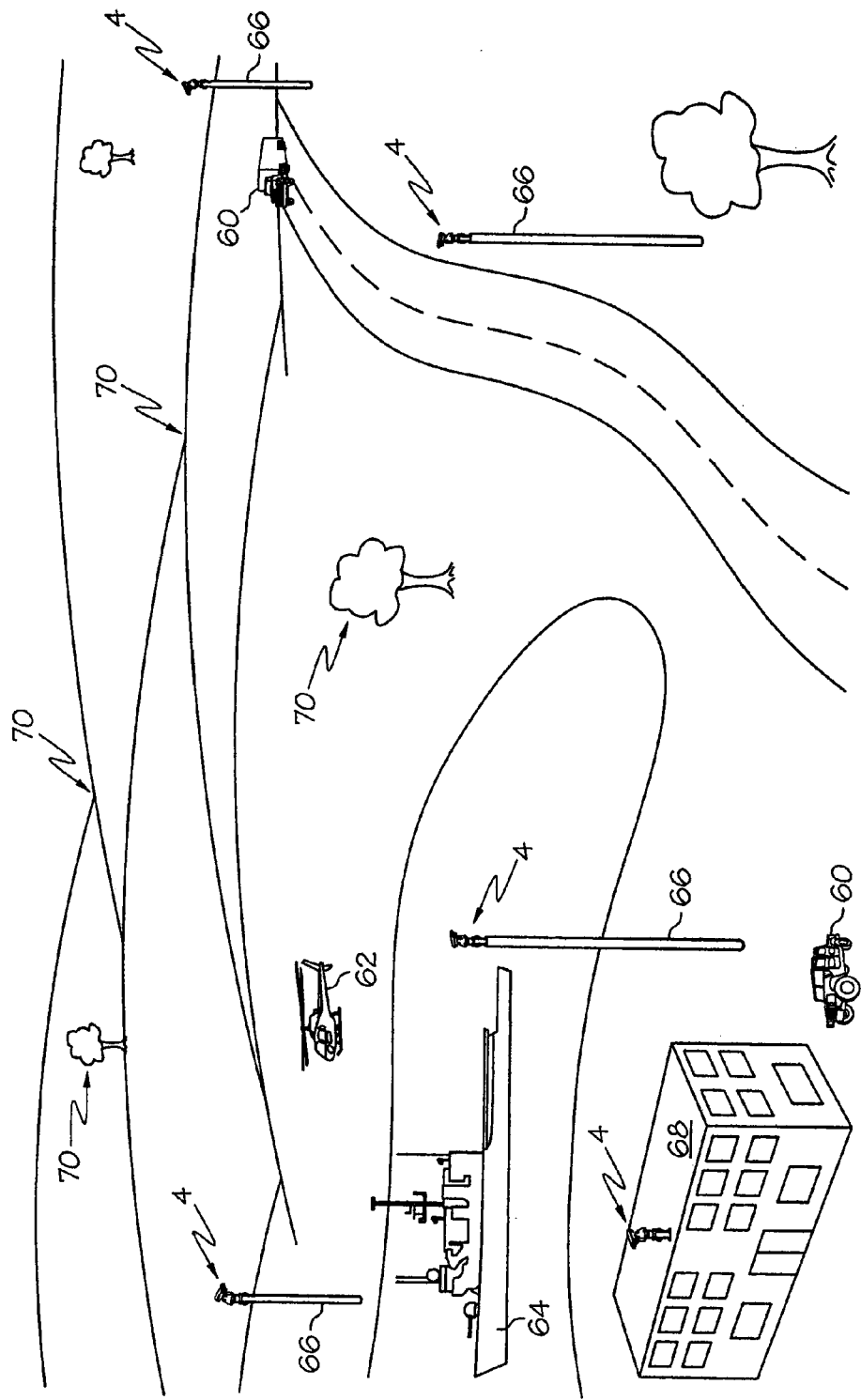
FIG. 7 depicts the environment of FIG. 6 with a plurality of image capture systems.

It will be appreciated that the display may include image(s) from more than one image capture system (4). For example, where an arrangement such as the one depicted in FIG. 7 is used, the display may simultaneously include images from two or more of the image capture systems (4). This may include providing a user the option of selecting among the plurality of image capture systems (4) for displaying corresponding captured images. In addition, regardless of the number of image capture systems (4) used, a user may be provided the option of configuring the display. This may include permitting the user to select among the various configurations illustrated in FIGS. 8A through 8E. Still other display configuration options may be provided to the user.

Having shown and described various embodiments and concepts of the invention, further adaptations of the methods and systems described herein can be accomplished by appropriate modifications by one of ordinary skill in the art without departing from the scope of the invention. Several of such potential alternatives, modifications, and variations have been mentioned, and others will be apparent to those skilled in the art in light of the foregoing teachings. Accordingly, the invention is intended to embrace all such alternatives, modifications and variations as may fall within the spirit and scope of the appended claims and is understood not to be limited to the details of structure and operation shown and described in the specification and drawings.

The invention claimed is:

1. A method for correlating views of two or more video camera systems in an environment, the method comprising:
    obtaining a first data point coordinate set corresponding to a first video camera system, the first data point coordinate set representing the location of a data point object in the environment relative to the first camera system, the first camera system providing an immersive view of the environment;
    obtaining a second data point coordinate set corresponding to a second video camera system, the second data point coordinate set representing the location of the data point object in the environment relative to the second camera system, wherein the second camera system comprises a pan-tilt-zoom video camera having a view of the environment that is narrower than the immersive view;
    storing the first and second data point sets as correlation data;
    detecting a detectable reference provided by a laser on a data point object in the immersive view;
    indicating a point of interest in the immersive view; and
    correlating the views of the first and second camera systems by referencing the correlation data and adjusting the view of the second video camera system based on the correlation data and the detectable reference such that the detectable reference corresponds to the point of interest.

2. The method of claim 1, wherein a plurality of first and second data point coordinate sets are stored as correlation data.

3. The method of claim 2, wherein the act of correlating comprises interpolation or extrapolation using the data point coordinate sets.

4. The method of claim 1, wherein the act of adjusting comprises orienting only the second camera system.

5. The method of claim 1, wherein the act of obtaining a second data point comprises orienting the line of sight for the second camera system such that the data point object is displayed in the video image from the second camera system.

6. The method of claim 5, wherein the act of obtaining a first data point comprises selecting the data point object in the environment from the video image of the first video camera system.

7. The method of claim 1, wherein the data point object is identified using object recognition algorithms.

8. A video image capture system, comprising:
    a first video camera system configured to capture an immersive video image, the first video camera system providing a wide field of view of an environment;
    a second video camera system comprising a pan-tilt-zoom video camera, the pan-tilt-zoom video camera providing a narrow field of view within the wide field of view of the immersive video image;
    a laser used for correlating the wide and narrow fields of view by providing an detectable reference on a data point object; and
    an interface used for indicating a point of interest in the immersive video image;
    wherein the wide and narrow fields of view are correlated by detecting the detectable reference in the wide field of view, and orienting the second video camera system such that the detectable reference corresponds to the point the interest.

9. The video image capture system of claim 8, wherein a plurality of first and second data point coordinate sets corresponding to the first and second video camera systems are stored as correlation data, the first and second data point coordinate sets representing a location of a data point object relative to the first and second video camera systems.

10. The video image capture system of claim 9, wherein the act of correlating comprises interpolation or extrapolation using the data point coordinate sets.

11. The video image capture system of claim 8, wherein the act of orienting comprises orienting only the second camera system.

12. The video image capture system of claim 9, wherein the second data point coordinate set is obtained by orienting the line of sight for the second camera system such that the data point object is displayed in the video image from the second camera system.

13. The video image capture system of claim 12, wherein the first data point coordinate set is obtained by selecting the data point object in the environment from the video image of the first video camera system.

14. The video image capture system of claim 8, wherein a data point object in the environment is identified using object recognition algorithms.

* * * * *